United States Patent
Baur et al.

(10) Patent No.: US 6,563,232 B2
(45) Date of Patent: May 13, 2003

(54) PROCESS FOR TRIGGERING PASSENGER PROTECTION SYSTEMS

(75) Inventors: Richard Baur, Pfaffenhofen (DE); Guenter Fendt, Schrobenhausen (DE); Robert Hussmann, Bobingen (DE); Alfons Woehrl, Schrobenhausen (DE)

(73) Assignee: Temic Telefunken microelectronic GmbH, Nuremberg (DE)

( * ) Notice: Subject to any disclaimer, the term of this patent is extended or adjusted under 35 U.S.C. 154(b) by 32 days.

(21) Appl. No.: 09/850,538

(22) Filed: May 7, 2001

(65) Prior Publication Data

US 2001/0052730 A1 Dec. 20, 2001

(30) Foreign Application Priority Data

May 6, 2000 (DE) .......................... 100 22 173

(51) Int. Cl.[7] ............................... B60R 21/01
(52) U.S. Cl. ..................... 307/10.1; 307/121
(58) Field of Search ............... 307/9.1, 10.1, 307/121; 280/735; 701/45–47

(56) References Cited

U.S. PATENT DOCUMENTS

| | | | |
|---|---|---|---|
| 4,975,850 A | * 12/1990 | Diller | 280/735 |
| 5,021,678 A | * 6/1991 | Diller | 280/734 |
| 5,173,614 A | 12/1992 | Woehrl et al. | |
| 5,229,943 A | * 7/1993 | Eigler et al. | 280/735 |
| 5,343,411 A | * 8/1994 | Olsson | 324/162 |
| 5,428,534 A | 6/1995 | Wetzel et al. | |
| 5,765,031 A | 6/1998 | Mimuth et al. | |
| 6,036,225 A | 3/2000 | Foo et al. | |
| 6,199,903 B1 | 3/2001 | Brambilla et al. | |
| 2001/0052730 A1 | * 12/2001 | Bauer et al. | 307/10.1 |

FOREIGN PATENT DOCUMENTS

| | | | |
|---|---|---|---|
| DE | 3816591 | 11/1989 | |
| DE | 4220270 | 12/1993 | |
| DE | 4324753 | 3/1994 | |
| DE | 19503460 | 3/1996 | |
| DE | 19729960 | 11/1998 | |
| DE | 19740019 | 3/1999 | |
| DE | 19740021 | 3/1999 | |
| DE | 19753163 | 6/1999 | |
| DE | 19813952 | 11/1999 | |
| DE | 19816989 | 11/1999 | |
| DE | 19930065 | 2/2000 | |
| GB | 2263571 | * 7/1993 | B60R/21/32 |
| WO | WO00/30902 | 6/2000 | |

* cited by examiner

Primary Examiner—Fritz Fleming
(74) Attorney, Agent, or Firm—W. F. Fasse; W. G. Fasse

(57) ABSTRACT

A passenger protection system is triggered directly at least when a second stage is reached among at least two different stages of an accident hazard an/or accident force, determined in accordance with sensor signals. Already when a first accident hazard and/or accident force stage is reached, at least an indirect trigger command is sent to individual passenger protection systems, a specified time interval is started, and, in the event of the second accident hazard and/or accident force stage not being reached within the specified time interval, a cancel command is sent to cancel the indirect trigger command. On receipt of such an indirect trigger command the passenger protection systems also start a relevant time interval, and in the event of the cancel command not being received on expiry of the relevant time interval, they automatically activate the triggering of the passenger protection systems.

4 Claims, 3 Drawing Sheets

PROCESS FOR TRIGGERING PASSENGER PROTECTION SYSTEMS

FIELD OF THE INVENTION

The invention relates to a process for triggering passenger protection systems using at least two stages of an accident hazard or force.

BACKGROUND INFORMATION

Such processes are known for example from DE 42 20 270 A1, DE 43 24 753 A1 and DE 197 40 019 A1. In all these processes, passenger protection systems are triggered in at least two different stages of an accident hazard and/or accident force, determined in relation to sensor signals, with the passenger protection systems being triggered by a direct trigger command at least when the second stage of the accident hazard and/or accident force is reached. In order to generate the sensor signals describing the actual accident hazard and/or accident force, deformation sensors with a capability to respond particularly early to an accident, and located on external vehicle areas, are used in addition to acceleration-sensitive sensors. Furthermore, a process is known from DE 197 29 960 A1, for example, which triggers passenger protection systems by taking into account so-called precrash sensors that register any change in the relative distance and/or relative speed of objects within the immediate vicinity of the vehicle environment, and which in the event of a safety critical approach being detected, particularly in the case of an unavoidable collision, already generate a relevant sensor signal in line with the accident hazard. In relation to such a precrash sensor signal, passenger protection systems are triggered either directly or after further sensor signals have been taken into account, in particular the course of acceleration, with the trigger threshold causing a system to be triggered being possibly lowered in the case of a prior precrash signal.

In this case the precrash signal is assigned to a first accident hazard stage and reaching a relevant trigger threshold of the acceleration signal is assigned to the second stage of the accident hazard and/or accident force.

In addition, from DE 199 30 065 A1 for example, a process is also known for controlling passenger protection systems where it is only the acceleration signal that is evaluated in several stages, leading to an appropriately staged triggering of these systems.

In connection with the passenger protection systems located in a distributed arrangement around the vehicle there is always the fundamental question as to a safe and trouble-free transmission of data to these passenger protection systems. For this reason, a number of applications—for example, DE 198 13 952 A1 and DE 195 03 460 C1—concern themselves with the error redundant data transmission within the bus system of passenger protection systems. Here, in the event of a short circuit to ground or a supply potential, data transmission is adapted by appropriate signalization.

However, in the event of a complete separation/cutoff of signal carrying lines during the course of an accident, it will not be possible in any case whatever to trigger the passenger protection systems that have been cut off in this way.

SUMMARY OF THE INVENTION

Therefore, it is the task of the invention to state a process for triggering passenger protection systems by means of which a still further improved protection for passengers is achieved.

This task is achieved according to the invention in a method of the above mentioned general type, further having the following special features.

To this end, when a first accident hazard and/or accident force stage is reached, an indirect trigger command is sent at least to individual passenger protection systems, that is, a trigger command which does not immediately cause a system to be triggered. This indirect trigger command can be issued directly by the sensors for determining the accident hazard and/or accident force, inasmuch as these feature a relevant direct connection to a common bus system, or by a central processing unit interrogating these sensors. A specified time interval is started, and in the event of the second accident hazard or accident force stage not being reached within the specified time interval, a cancel command is sent which cancels again the indirect trigger command, i.e. undoes the same.

On receipt of such an indirect trigger command the respective passenger protection systems also start a relevant time interval, and in the event of the cancel command not being received within this time interval, i.e. on expiry of the said interval, the respective passenger protection systems are triggered.

In this way, it is possible to ensure that any crash-induced separation of the passenger protection system from the bus system, which occurs after the first accident hazard and/or accident force stage has been reached, will still provide for the separated passenger protection system to be triggered.

In comparison to a time-delayed triggering when all communication with the central processing unit or the sensors has been lost, and where it is also not possible to take into account an actual accident hazard and/or accident force, this process provides the security that the passenger protection systems—separated from the bus system during the course of the accident—are triggered only if an actual accident hazard and/or initial accident stage is detected.

If the risk falls below the first accident hazard and/or accident force stage, the cancel command is preferably sent immediately to stop the indirect triggering of the respective passenger protection systems, that is, the time-delayed triggering of the said systems in accordance with the specified time interval. In addition to sending a cancel command, if the first accident hazard and/or accident force stage is still reached as before, it is possible to resend a new indirect trigger command at a time within the specified time interval by means of which command the time intervals in the central processing unit or the sensors, on the one hand, and in the passenger protection systems on the other, are restarted so that—if there is no change in the applicable first accident hazard and/or accident force stage—a decision on whether to trigger or not to trigger can be delayed even beyond the duration of a time interval, with the respective passenger protection systems always being triggered in the event of the data transmission being disconnected due to an accident event.

In principle, it is also conceivable that more than just two stages of accident hazard and/or accident force are provided for, with the various individual passenger protection systems being allocated a lower stage and a higher stage, respectively, in line with the first and second stages. If, for example, individual passenger protection systems are triggered only when a third stage of accident hazard, or rather accident force, has been reached, a lower stage—that is, the first or second accident hazard or accident force stages—may give an indirect trigger command in identical fashion, which, when data connections are interrupted, will cause the respective passenger protection systems to be triggered on expiry of the time interval without the relevant cancel command or a renewed indirect trigger command having been received.

BRIEF DESCRIPTION OF THE DRAWINGS

In the following, the invention will be explained in connection with example embodiments and the accompanying drawings, wherein.

DETAILED DESCRIPTION OF EXAMPLE EMBODIMENTS OF THE INVENTION

Figure 1:
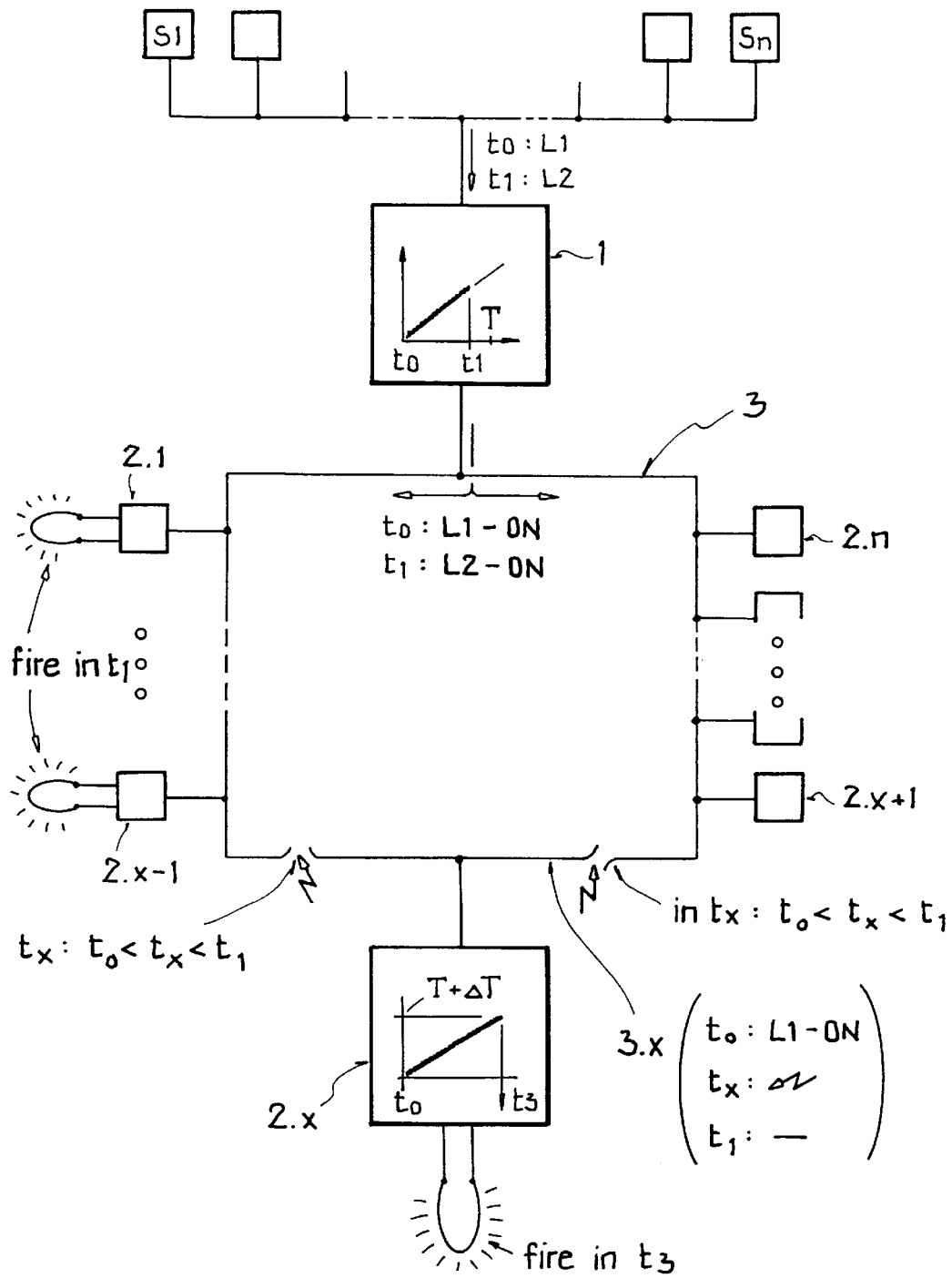
FIG. 1 shows a passenger protection system in a motor vehicle.

FIG. 1 shows a passenger protection system for motor vehicles consisting of a central processor unit 1 which is connected with passenger protection systems 2, particularly including systems 2.1, . . . 2.x–1, 2.x, 2.x+1, . . . 2.n, via a bus system 3, whereby systems 2.1 to 2.x versus systems 2.x+1 to 2.n may be set to different triggering levels. In this example, the central processor unit 1 serves to prepare the sensor signals from the sensors S1–Sn for determining the accident hazard and/or accident force, that is, typically from precrash sensors, deformation sensors on outside vehicle areas as well as in particular acceleration sensors.

In principle, however, it is also conceivable that these sensors S1–Sn send appropriate sensor signals—prepared according to accident hazard or accident force stages—directly to the passenger protection systems 2, without a central processor unit 1 being connected therebetween.

If, in this example, the central processor unit 1 receives a sensor signal from the sensors S1–Sn at the time to, indicating that the first accident hazard or accident force stage L1 has been reached, then the central processor unit 1 will pass on this signal via the bus system 3 to all passenger protection systems 2.1–2.n in the form of an indirect trigger command L1-ON. In the central processor unit 1, however, a specified time interval T is started, whose significance will be explained in more detail in connection with FIG. 2. The respective passenger protection systems 2.1–2.x also start a relevant time interval T+ΔT on receipt of this indirect trigger command L1-ON. If, at time t1, the sensors S1–Sn now indicate that the second accident hazard or accident force stage L2 has been reached, then the central processor unit 1 will send an appropriate direct trigger command L2-ON via the bus system to the passenger protection systems at time t1. Then the passenger protection systems 2.1–2.x assigned to this stage L2 are triggered. However, if a line disconnection occurs for a time tx between t0 and t1, as shown in FIG. 1 by means of the disconnected line section 3.x connected to the passenger protection system 2.x, then the direct trigger command L2-ON can no longer reach this line section 3.x, and thus the passenger protection system 2.x, at time t1.

But the passenger protection system 2.x, just as the other passenger protection systems 2.1–2.x–1 at time t0, also has started a time interval T+ΔT corresponding to the time interval T in the central processor unit 1. plus a further delay ΔT. On expiry of this time interval T+ΔT, the respective passenger protection system, that is 2.x, will trigger at time t3, if a cancel command (L1-OFF at t2, see FIGS. 2 and 3) has not been received.

FIG. 2 now shows in further detail the alternative process sequences, with the diagrams 2a and 2b describing the signals of the sensors S1, for example a precrash sensor, and Sn, for example an acceleration sensor, diagram 2c showing the corresponding sequence within the central processor unit 1, and diagram 2d the relevant sequence within the passenger protection systems, for example 2.x.

If at the time t0, for example, the precrash sensor S1 detects an object intruding directly into the immediate surrounding area of the vehicle, then, at time t0, this sensor S1 sends a signal to the central processor unit 1, indicating the first accident hazard stage L1. As shown in diagram 2c, the central processor unit 1 then accepts this first accident hazard stage L1 and starts a time interval T on expiry of which time interval, if a second accident hazard or accident force stage L2 is not reached in t2, the first stage L1 would be reset. This is illustrated schematically in diagram 2c by the staged drop between t0 and t2. When the first stage L1 is reached at time t0, the central processor unit 1 sends an appropriate indirect trigger command L1-ON to the respective passenger protection system, as illustrated schematically in the diagrams 2c and 2d. The respective passenger protection systems 2.1–2.x also start a relevant time interval T+ΔT, corresponding to the time interval T in the central processor unit 1, on receipt of this indirect trigger command L1-ON, with the time interval T+ΔT in the passenger protection system 2.x being slightly larger by the amount +ΔT in order to be able to compensate still a certain response delay in the central processor unit 1 and for data transmission. The starting of this time interval T+ΔT is now shown in diagram 2d as a staged rise from the first stage L1 to the second stage L2, as in contrast to the sequence in the central processor unit 1—on expiry of the time interval T+ΔT without prior receipt of a cancel command (L1-OFF)—the second stage L2, and thus the activation of the respective passenger protection systems, would follow.

Now, if at time t1 for example the acceleration sensor Sn reaches the trigger threshold $a_{fire}$ and correspondingly indicates this second accident hazard or accident force stage L2 to the central processor unit 1, then the second stage L2 is accepted in the central processor unit, and a direct trigger command L2-ON is sent to the passenger protection systems. This case is shown by reference a in diagram 2c and by a reference a1 in diagram 2d. The passenger protection systems 2.1–2.x are triggered on receipt of this direct trigger command L2-ON in t1, as illustrated schematically in diagram 2d as a change to L2 as shown by reference a1.

However, if—as shown in diagram 2c as case b—the second accident hazard or accident force stage L2 is not reached within the specified time interval T in the central processor unit 1, then, on expiry of this time interval T at time t2 the cancel command L1-OFF is sent to the passenger protection systems 2, canceling the preceding indirect trigger command L1-ON. In such a case (marked as (b) in FIG. 2), the further behavior of the passenger protection systems 2 now depends on the receipt of this cancel command L1-OFF. On receipt of such a cancel command L1-Off within the appropriate time interval T+ΔT at time t2, the passenger protection system will either be reset completely (case b1) or at least to the start of stage L1 (case b2).

Figure 2A:
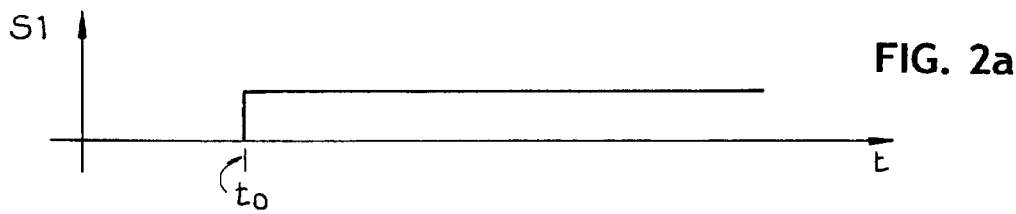
FIG. 2 shows alternatives in the triggering behavior in relation to the sensor signals and the expiry of the time interval.
Figure 2B:
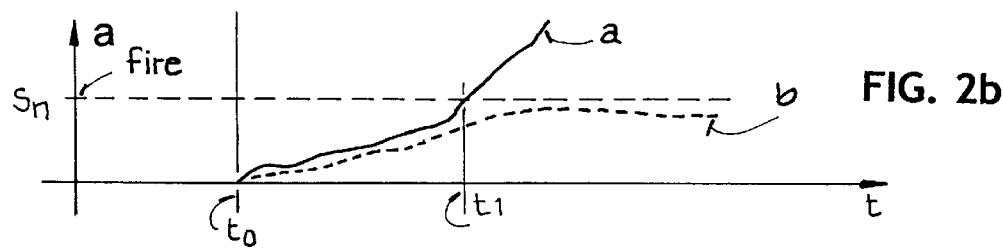
Figure 2C:
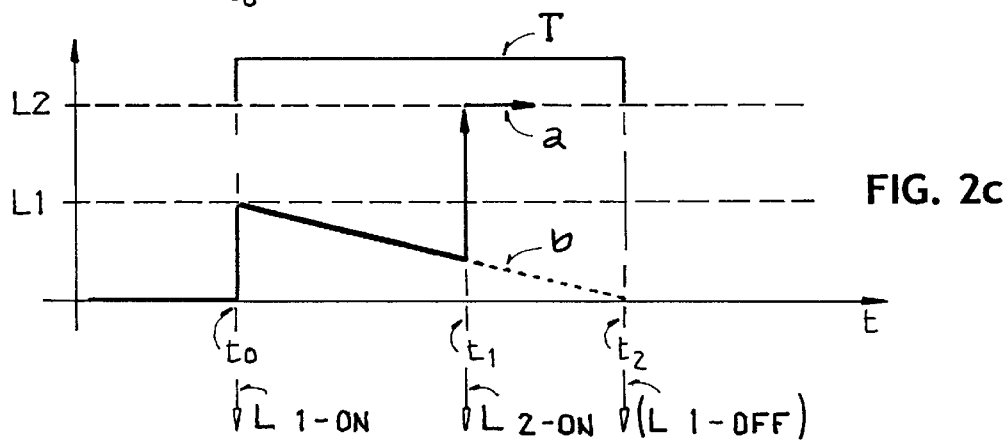
Figure 2D:
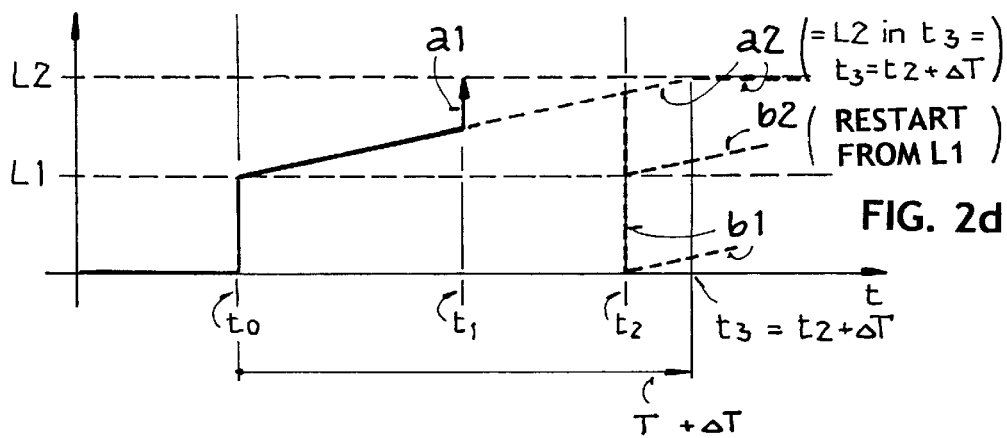

If, on receipt of this indirect trigger command L1-ON at time t0, no cancel command L1-OFF occurs in the passenger protection system 2.x at time t3 until the time interval T+ΔAT has expired, then the passenger protection system will be fired at time t3, as shown schematically by reaching the second stage L2 as case a2 in FIG. 2d.

This will ensure that, if data transmission is interrupted during the course of the accident events, even the subsequently separated passenger protection systems are still triggered.

Figure 3A:
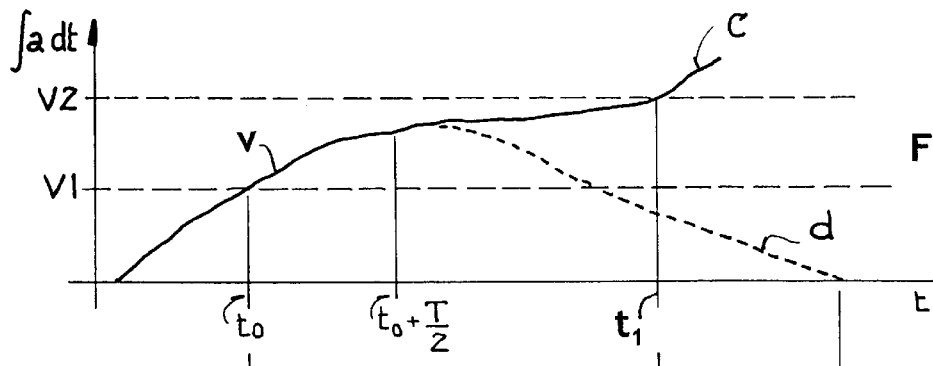
FIG. 3 shows an embodiment with the re-start of the time interval in the event of a continuous first stage of the accident hazard or accident force.
Figure 3B:
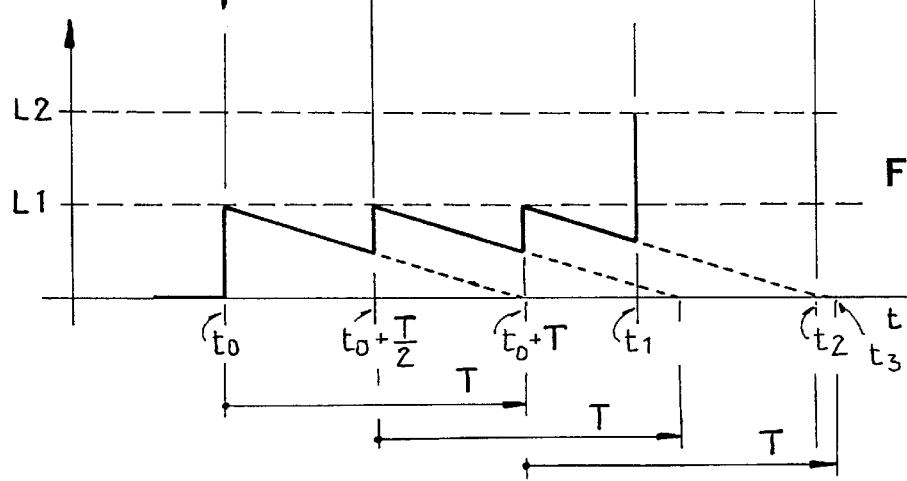

FIG. 3 now shows a further embodiment of this process where at time +T/2 within the time interval T new indirect trigger commands L1-ON (t0, t0+T/2) are resent, thus delaying the sequence of time intervals.

Diagram 3a first shows the case of the assignment of the different accident hazard or accident force stages to a single sensor signal; in this example, an integrated acceleration signal v=∫a dt subject to a time limit, with at least two different trigger stages corresponding to different threshold values V1 and V2 of the sensor signal. Again, a trigger case (c) and a non-trigger case (d) are shown.

If, at time t0, the sensor signal reaches the threshold value V1 and thus passes a corresponding signal L to the central processor unit 1, then this sets the time interval T and monitors the further behavior of the sensor signal. In addition, a corresponding indirect trigger command L1-ON is sent to the passenger protection systems 2.1–2.x which, analog to FIG. 2, will start respectively their internal time interval T+ΔT. If the central processor unit 1 detects at a time within the time interval T—in this embodiment in FIG. 3 respectively at +T/2—that the first accident hazard and/or accident force stage L1 is still reached without change, then the central processor unit 1 resends a new indirect trigger command L1-ON and resets the time interval T (compare diagram 3b at time t0+T/2) to Restart. In analog fashion, on receipt of such a new indirect trigger command L1-ON at time t0+T/2, the passenger protection systems will reset their respective corresponding time interval T+ΔT, as shown schematically in FIG. 3c.

This is again repeated at time +T/2 of the meanwhile new time interval T—that is, at time t0+T—in the central processor unit 1 (diagram 3b) as well as in the passenger protection systems (diagram 3c).

If, at time t1, the sensor signal v reaches the second trigger threshold V2 (compare diagram 3a), then the central processor unit 1 will set the second accident hazard or accident force stage L2 and transmits the appropriate direct trigger command L2-ON at time t1 to the passenger protection systems 2.1–2.x.

Figure 3C:
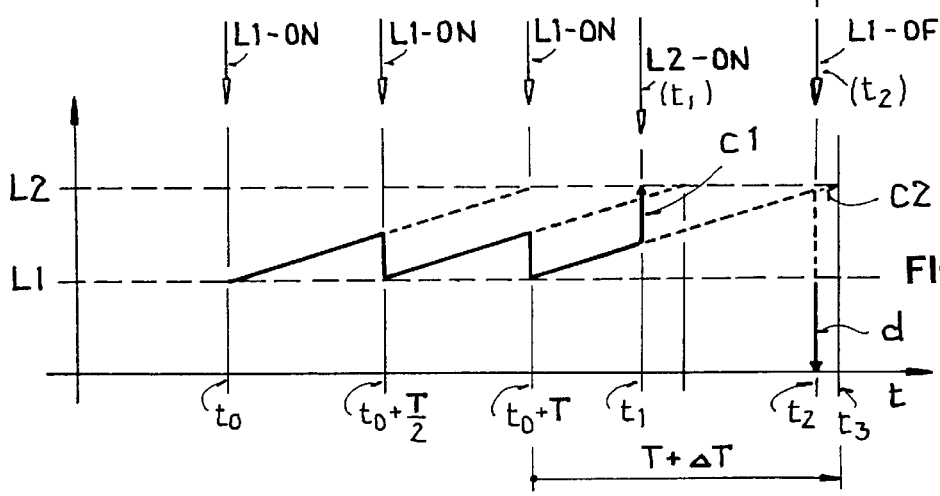

If this direct trigger command L2-ON reaches the passenger protection systems with the data bus still intact, then these will be triggered directly, as shown schematically by case c1 in FIG. 3c in the form of an immediate changeover to stage L2.

However, if the current time interval T passes in the central processor unit 1 and if the central processor unit 1 does not receive a sensor signal corresponding at least still to the first stage L1, then the central processor unit 1 will set the cancel command L1-OFF at time t2. Then the passenger protection system 2.x is reset at time t2, as shown schematically by case d in diagram 3c. However, if, at time t1, due to an interruption the passenger protection system 2.x is no longer able to receive the direct trigger command L2-ON at time t1, then on expiry of time interval T+ΔT at time t3 the passenger protection system is triggered automatically, as shown schematically by case c2 in diagram 3c in the form of reaching the stage L2.

Naturally, the embodiment examples shown can be applied to a large number of different types of passenger protection systems, in particular belt tensioners and airbags, with the respective accident hazard and accident force measure in the individual two stages possibly being specified differently for different passenger protection systems. In particular, in the case of an airbag featuring a multi-stage triggering system an appropriate assignment of higher accident force stages can be applied to direct triggering. Correspondingly, even the first stage L1 for sending an indirect trigger command L1-ON can be adjusted to an appropriately higher accident hazard or accident force measure. It is considered to be advantageous here to provide standard accident hazard and accident force stage definitions for the entire passenger protection system and to assign appropriate different stages to the passenger protection systems where, correspondingly, an indirect or direct trigger command is set in accordance with the process.

What is claimed is:

1. A process for triggering passenger protection systems in at least two different accident hazard and/or accident force stages determined in line with sensor signals, a) with the triggering being effected at least when the second accident hazard and/or accident force stage is reached by means of a direct trigger command to the passenger protection systems, wherein
   b) if the first accident hazard and/or accident force stage is reached at least an indirect trigger command is sent to individual passenger protection systems, a specified time interval is started, and, in the event of the second accident hazard and/or accident force stage not being reached within the specified time interval, a cancel command is set to cancel the indirect trigger command, and,
   c) on receipt of such an indirect trigger command, the respective passenger protection systems also start a relevant time interval, and in the event of the cancel command not being received on expiry of this relevant time interval, the respective passenger protection systems are triggered.

2. The process according to claim 1, wherein if an actual sensor value of the sensor signals falls below the first accident hazard and/or accident force stage, then the cancel command is sent immediately.

3. The process according to claim 1, wherein at a time within the specified time interval in the case of the first accident hazard and/or accident force stage being reached without any change, a new indirect trigger command is sent, the specified time interval is restarted, and the respective passenger protection systems restart the relevant time interval on receipt of the new indirect trigger command.

4. A process for triggering a passenger protection system responsive to sensor signals, comprising:

a) providing sensor signals indicating at least one of a first accident hazard or force stage and a second accident hazard or force stage that is greater than said first accident hazard or force stage;
   b) if said sensor signals indicate said second accident hazard or force stage, then providing a direct trigger command;
   c) if said direct trigger command is received by said passenger protection system, then triggering an activation of said passenger protection system directly responsive thereto;
   d) if said sensor signals indicate said first accident hazard or force stage, then starting a first time interval and providing an indirect trigger command;

e) if said sensor signals do not indicate said second accident hazard or force stage during said first time interval, then providing a cancel command upon expiration of said first time interval;
f) if said indirect trigger command is received by said passenger protection system, then starting a second time interval;
g) if said cancel command is received by said passenger protection system during said second time interval, then cancelling an effect of said indirect trigger command; and
h) if said cancel command is not received by said passenger protection system during said second time interval, then triggering an activation of said passenger protection system upon expiration of said second time interval.

* * * * *